BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 41

T857003

~~599,087~~

METHOD FOR SECURING A LINING TO A SHAPED THERMOPLASTIC ARTICLE

Charles G. Chandler, % Tennessee Eastman Company, P.O. Box 511, Kingsport, Tenn. 37662

Filed Dec. 5, 1966. Published Dec. 3, 1968

Class 156—224

1 Sheet Drawing, 10 Pages Specification

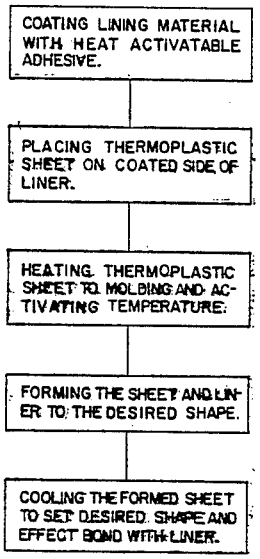

A textile or other type lining is secured during the molding step to a shaped article formed from a thermoplastic material. This is accomplished by the steps of coating a lining material with a heat activatable adhesive, bringing a sheet of thermoplastic material from which the article is to be formed in contact with the coating, activating the coating by applying heat either from the sheet if it is pre-heated or from an external source, molding the sheet by vacuum forming to the desired configuration, and cooling to set the shape and effect a bond between the shaped sheet and the lining.

United States Patent Office

PTO - BOYERS, PA Duty Station

MISSING PAGE TEMPORARY NOTICE

PATENT # T 857003 FOR ISSUE DATE 12-3-1968 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheet 1

N/A at Boyers
6/1/94

Data Conversion Operation

Boyers, Pa